United States Patent
Bar-Cohen et al.

(10) Patent No.: US 6,863,136 B2
(45) Date of Patent: Mar. 8, 2005

(54) SMART-ULTRASONIC/SONIC DRILLER/CORER

(76) Inventors: Yoseph Bar-Cohen, 3721 Fuchsia St., Seal Beach, CA (US) 90740-2855; Stewart Sherrit, 1101 E. Loma Alta, Altadena, CA (US) 91001; Benjamin Dolgin, 9249 Reseda Blvd., #104, Northridge, CA (US); Thomas M. Peterson, 4249 Neptune St., Erie, PA (US) 16506; Dharmendra Pal, 5444 Cidermill Rd., Erie, PA (US) 16519; Jason Kroh, 935 W. 32nd St., Erie, PA (US); Ron Krahe, 8765 State Rd., Girard, PA (US) 16417

( * ) Notice: Subject to any disclaimer, the term of this patent is extended or adjusted under 35 U.S.C. 154(b) by 317 days.

(21) Appl. No.: 10/258,007

(22) PCT Filed: May 2, 2001

(86) PCT No.: PCT/US01/14289

§ 371 (c)(1),
(2), (4) Date: Oct. 17, 2002

(87) PCT Pub. No.: WO01/83933

PCT Pub. Date: Nov. 8, 2001

(65) Prior Publication Data

US 2004/0007387 A1 Jan. 15, 2004

Related U.S. Application Data

(60) Provisional application No. 60/201,650, filed on May 3, 2000.

(51) Int. Cl.[7] .............................. E21B 7/24; E21B 47/00

(52) U.S. Cl. .............................. 175/55; 175/20; 175/50; 175/58; 175/316

(58) Field of Search .............................. 175/19, 20, 40, 175/50, 55, 56, 58, 92, 293, 316; 181/102–106, 209

(56) References Cited

U.S. PATENT DOCUMENTS

| | | | | |
|---|---|---|---|---|
| 3,808,820 A | * | 5/1974 | Bodine | 405/232 |
| 3,900,826 A | * | 8/1975 | Dowling et al. | 367/31 |
| 3,901,075 A | * | 8/1975 | Hampton et al. | 73/170.32 |
| 5,549,170 A | * | 8/1996 | Barrow | 175/55 |
| 5,595,243 A | * | 1/1997 | Maki et al. | 166/177.2 |
| 5,984,023 A | * | 11/1999 | Sharma et al. | 175/50 |

* cited by examiner

Primary Examiner—Kenn Thompson
(74) Attorney, Agent, or Firm—Walter A. Hackler

(57) ABSTRACT

Apparatus for probing, sensing, testing penetrating and sampling a medium generally includes an actuator (12) for generating vibrations at ultrasonic frequencies and a horn (14) coupled to the actuator (12) for amplifying the actuator vibrations along with a non-rotating coring and drilling bit (16) for penetrating the medium. A bit (16) includes a drill stem (20) attached to the horn (14) and a bore (26) extends through the bit (16), horn (14) and actuator (12) for withdrawal of samples. A free mass (36) is disposed between the horn (14) and the drill stem (20) for oscillating therebetween in response to the actuator vibration for causing migration of medium debris around and through the actuator bore for effectively self-cleaning of the bit (16). The hammering action of the free mass (36) is used for penetration of the medium and for analysis of the medium though the use of spaced apart accelerometers (92 and 94).

23 Claims, 3 Drawing Sheets

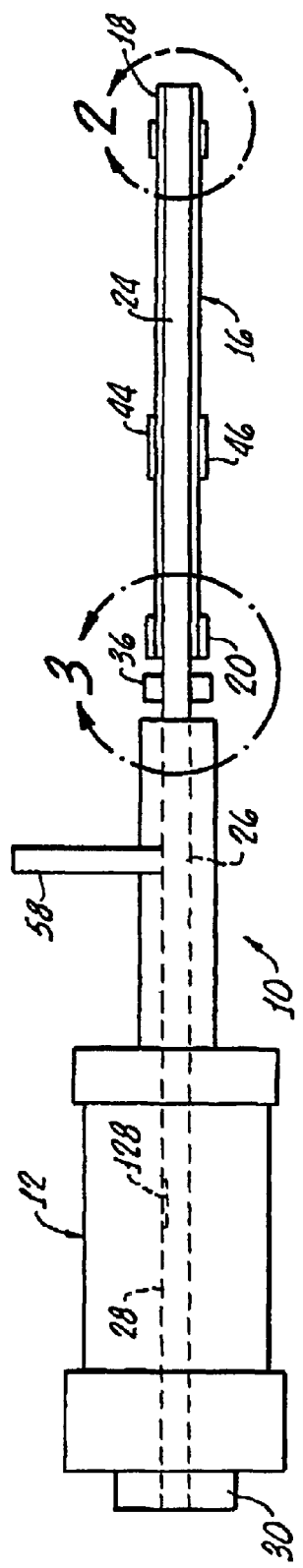
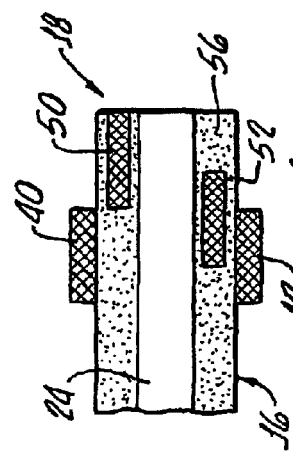
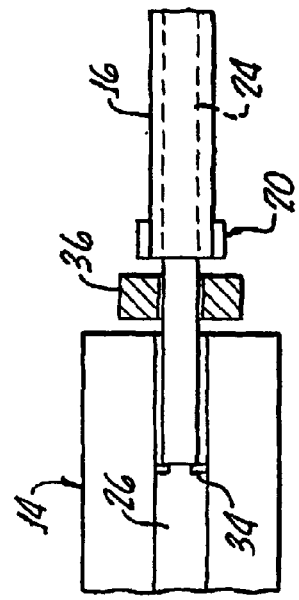
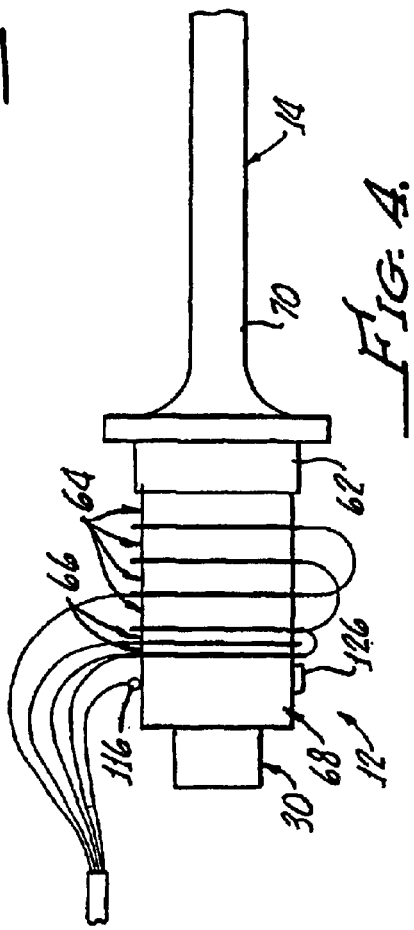
Fig. 1.
Fig. 2.
Fig. 3.
Fig. 4.

SMART-ULTRASONIC/SONIC DRILLER/CORER

This application claims benefit of Ser. No. 60/201,650 filed May 3, 2000.

The present invention generally relates to the field of ultrasonic drilling, and more particularly, relates to apparatus for probing, testing, and penetrating a medium.

Effective probing, drilling and coring apparatus finds use in a great number of areas such as, for example, planetary exploration, military, medical operations, construction, police investigations, geology, archaeology sports (for example hiking and rock climbing) and other games.

To assure effective operation it is preferable to have probing capability for pre-screening at the medium. For different measurement techniques, various forms of samples are needed and real time sensing and analysis with minimum destruction of the surroundings is highly desirable. The need for such capability has risen sharply with the evolution of the NASA objective to collect samples, conduct planetary in-situ analysis and return such samples to the Earth.

Existing drilling techniques are limited by the need for high axial forces, large power consumption, as well as a need to operate from an heavy platform to drill in non-horizontal and/or hard surfaces. The life of coring bits is markedly reduced by the breakdown of the binder that holds abrasive material on a bit surface.

Accordingly, the capability of existing rotary corers has limited application in power and mass constrained environments. As an example, a typical rotary corer that produces 10 mm cores in hard rocks requires at least 20 to 30 watts of power. Such drilling rigs cannot be duty cycled without a staggering loss of efficiency. In addition, drill motors can demand as much as three to four times surge current upon startup then during continuous operation.

Conventional rotary corers that, for example, produce 10 mm diameter cores which may require about 100-N to 150-N or more of axial preload and during core initiation, drill walk can induce torques on the drilling platform that may exceed 30 Nm and tangential forces of 100-N. The drill chatter delivers a low frequency, for example 2–10 Hz, high force perturbations on a drilling platform which requires conventional coring applications to utilize very stable and massive platforms.

In hard rock formations, conventional drillers and corers lose an advantage that they sometimes demonstrate in soft materials. In hard rocks, conventional drillers stop drilling by shearing and spoliation and become grinders. The grinding process is accompanied by a least a 300% increase in consumed energy per unit length of the core. In addition, because the grinding mechanism is determined by the compression failure of the rock, the sharp teeth of the corers must be re-sharpened frequently. Accordingly, sharpness of the bits must be monitored otherwise the heat generation at the tip may increase by a factor of 10. This increase is accompanied by a concomitant drop in drilling efficiency and often causes burning or melting of the drill bit.

Non-traditional drilling technologies, such as for example, lasers, electron beams, microwaves, hydraulic jets, are typically competitive only in applications that are not power limited. Down-the-well energy required to remove a unit volume of rock for so called "modern" technologies is about the same as grinding and melting, that is, three to five times higher than for shear drilling. Unfortunately, for modern technologies, the ratio of down-the-well power delivered verses input power generation is below several percent verses 10 to 30 percent for conventional drills. Accordingly, many space or power limited applications simply do not have enough power to employ a non-traditional drilling technique.

The present invention provides apparatus that can probe a medium for selection of drilling direction and operation parameters for optimal operation, extract samples of various forms and provide a platform for sensors to perform real time in-situ or remote post analysis. Outboard sensors provided information related to probing activity of the apparatus as well as sample analysis during penetration of a medium. Apparatus in accordance with the present invention is light weight and consumes low amounts of power/energy, in addition, operate at low and high temperatures at a plurality of pressure levels.

SUMMARY OF THE INVENTION

Apparatus for probing, testing and penetrating a medium in accordance with the present invention, generally includes an actuator for generating vibrations at ultrasonic frequencies and a horn coupled to the actuator for amplifying the actuator vibrations. The horn may be solid or include a central bore therethrough. A non-rotating drilling bit is provided for penetrating the medium with the bit having a drill stem communicating with the horn. A bore through the bit may be provided and in communicating with the horn bore when provided. The apparatus in accordance with the present invention utilizes a low axial load, which minimizes drill walk and requires a very small torque force and consumes very little power due to the non-rotating configuration of the bit.

In addition, a free mass is provided and disposed between the horn and the drill stem for oscillating therebetween in response to the actuator vibration. This provides for a hammering action on the bit, and in addition, causes migration of medium debris around and through the bit and actuator bore for effecting self-cleaning of the bit and operation self-optimization. Unlike conventional drills, apparatus in accordance with the present invention, does not include any gears or motors and does not require lubricants.

Particularly, apparatus with the present invention may further include a conduit for communicating with the horn bore for removing medium debris including tailings, dust, gases, liquids, vapors and volatiles from the apparatus through the actuator and the bit bores. Sensors disposed at a bit tip and sensors disposed along the bit may be provided for measuring electrical, mechanical and chemical properties of the medium and medium debris.

In one embodiment of the present invention, the ultrasonic actuator may include a piezoelectric stack, for example, a metal-piezoceramic-metal sandwich which enables operating over a very wide temperature range.

Preferably, the actuator, when utilizing a metal-piezoceramic-metal sandwich includes a bolt for compressing the sandwich in order to maintain compression on the piezoceramics and dissipate heat.

More particularly, the sandwich may comprises at least one driver for generating the vibration and at least one sensor for measuring a force or impact of the bit against the medium in order to determine mechanical properties of the medium. Further, the bolt may include a bore therethrough communicating with the horn bore and the bit bore for enabling medium cores to be extracted therethrough.

In one embodiment of the present invention, the apparatus further includes at least one accelerometer for positioning on the medium remote from the bit in order to sense elastic waves imparted to the medium by the oscillating free mass hammering.

BRIEF DESCRIPTION OF THE DRAWINGS

The advantages and features of the present invention will be better understood by the following description when considered in conjunction with the accompanying drawings, in which:

FIG. 1 is a cross-sectional representation of one embodiment of the present invention which generally includes an actuator for generating a vibrations at ultrasonic frequencies, a horn coupled to the actuator for amplifying the actuator vibrations, a non-rotating coring and drilling bit having a drill stem attached to the horn and a free mass disposed between the horn and the drill stem for oscillating therebetween along with sensors disposed at a bit tip and along the bit for measuring properties;

FIG. 2 in an enlarged cross-sectional view taken along line 2—2 of FIG. 1 illustrating the use of embedded and surface sensors on the bit tip;

FIG. 3 is an enlarged cross-sectional view taken along line 3—3 of FIG. 1 illustrating the communication between the drilling bit and the horn.

FIG. 4 in a representation of the actuator shown in FIG. 1 as a metal-ceramic-metal sandwich including a plurality of driver ceramics and a plurality of sensors ceramics:

DETAILED DESCRIPTION

Figure 5:
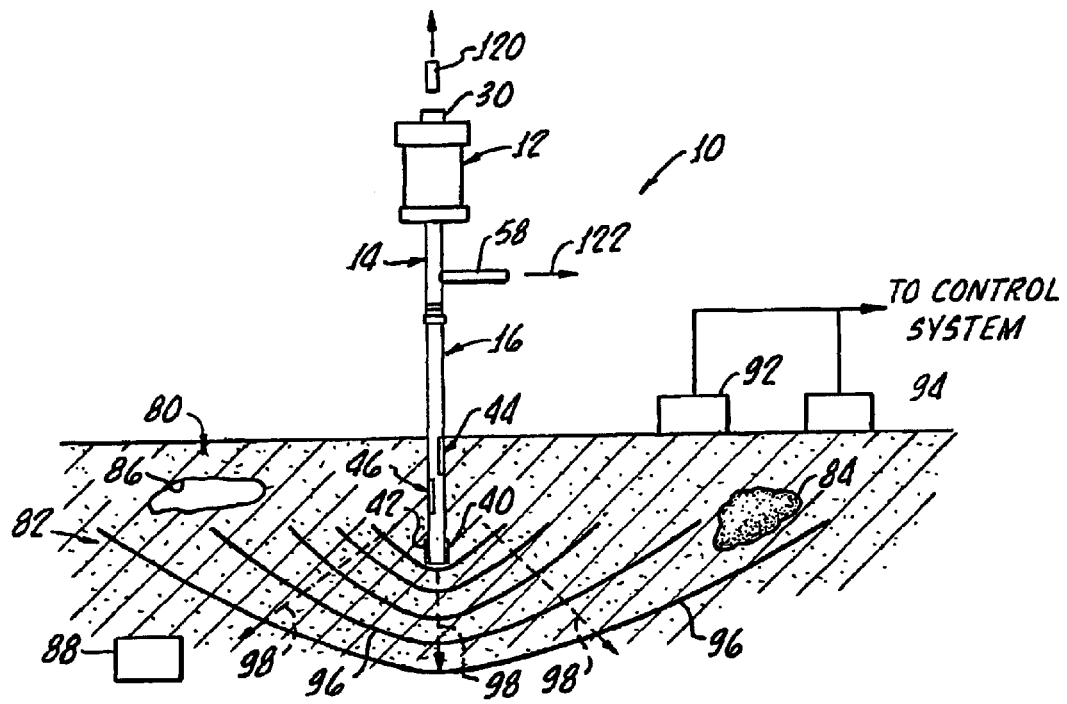
FIG. 5 is an alternative embodiment of the present invention including at least one accelerometer positioned on a medium remote from the bit for sensing elastic waves imparted to the medium by a hammering effect produced by the free mass shown in FIG. 1.

With reference to FIGS. 1–3, there is shown, in partial cross-section, apparatus 10 for probing, testing and penetrating a medium (not shown in FIG. 1) which generally includes an actuator 12 having a horn 14 coupled thereto for amplifying the actuator vibrations;

A non-rotating coring and drilling bit 16 includes a bit tip 18 and a drill stem 20, the latter communicating with the horn 14 as will be hereinafter described. The bit 16 and horn 14 may be solid, however as illustrated, a bore through the bit 16 communicates with a bore 26 through the horn 14 and a bore 28 through a bolt 30 for enabling sampling as hereinafter in greater detail.

The bit 16 may be formed from various high stiffness materials, metal alloys or polymers having a length of up to 5 feet and a diameter of between about 0.008 inches and about 30 inches. Because the bit 16 is non-rotating, any shaped cross-section of the bit may be utilized.

The actuator 12 and horn 14 may be coupled to one another in any conventional manner. As shown in FIG. 3 the drill bit 16 and stem 20 communicates with the horn 14 via an extension 32 which enters the horn base 26 and bears against a stop 34. A free mass 36 is disposed between the horn 14 and the drill stem 20 for oscillating therebetween in response to actuator vibrations. This free mass oscillation is described in co-pending U.S. patent application Ser. No. 09/518,801 filed on Mar. 3, 2000 which is incorporated herewith in its entirety for explaining the free mass oscillation The oscillation of the free mass 36 provides for a hammering function and also causes migration of media debris around and through the bit 16 which effects self-cleaning of the bit.

A combination of the actuator 12 and the free mass 36 forms an effective actuation mechanism that requires relatively low axial force that can be made to work at very low temperatures down to single digit Kelvin degrees to very high temperatures exceeding 800° Kelvin (500° C.).

In operation, the horn 14 amplifies the ultrasonic vibrations that are induced by the actuator 12 and impacts the free mass 36 that oscillates between the horn 14 and the drill stem 20. The free mass 36 allows the drill bit 16 to operate under a combination of the ultrasonic drive frequency (5 kHz and up) and a 10–5000 Hz sonic hammering. It is currently capable of high speed drilling (e.g., from 2 to 20 mm deep per watt-hour for a 6 mm diameter hole, in Basalt and Bishop Tuff respectively) using low axial preload (<5 N) and low power (lower than 2 Watts average has been demonstrated).

A variety of sensors 40 disposed at the tip 18 and sensors 44, 46 disposed in a spaced apart relationship with the tip are utilized for a multitude of analysis as will be hereinafter described in greater detail. As shown in FIG. 2, sensors 50, 52 may be embedded within a wall 56 of the bit tip 18.

As shown in FIG. 1, a conduit, or tube, 58 may be attached to the horn 14 which is in communication with the bore 26 therein for removing medium debris (not shown) including tailings, dust, gases, liquids, vapors and volatiles from the apparatus 10 through the actuator bore 26 and tip bore 24. This may be facilitated by applying a vacuum to the conduit 58.

With reference to FIGS. 1 and 4, the actuator 12 is a metal-piezoceramic-metal sandwich which includes a horn rim 62 driver ceramics 64 sensor ceramics 66 and a backing ring 68 compressed by the hollow bolt, or threaded tube, 30. The combination of the drivers. ceramics 64 and sensor ceramics 62 is taught in co-pending U.S. patent application Ser. No. 09/568,485 filed May 10, 2000, which is to be incorporated herewith in its entirety by this specific reference thereto for describing the operating of the actuator 12.

The bolt 30 keeps the piezoceramic 64, 66 in compression and further dissipates heats. The piezoelectric actuator 12 provides the ultrasonic actuation source in accordance with the present invention but it is to be appreciated that other types of actuators may be used, for example, voice coils, ferroelectric or electrostrictive or magnetostrictive actuators (not shown) may also me employed.

The actuator 12 operates as a quarter transformer with the backing ring 68 acting as a mechanical open circuit, i.e., effectively rigid. Under this condition, the actuator 12 radiates most of its output energy forward into the horn 14 and bit 16. The frequency at which the entire apparatus 10 resonates depends primarily on the density and sound velocity of the various components of the apparatus 10.

The stress bolt 30 maintains the strength of the sandwich actuator 12. When the actuator 12 vibrates under high drive voltage, the tensile strength reaches levels that can fracture the piezoelectric ceramics 64, 66. Therefore, the stress bolt 30 must be tightened to induce compression at a level that slightly exceeds the expected level of tensile stress.

The induced displacement amplitude of the actuator 12 is magnified mechanically by the front stepped horn which includes two or more concentric diameters of the horn end 62 and fore portion. For a given ratio of diameters, the stepped horn 14 offers the greatest displacement manufactured when compared to other geometries including tapered or exponential horns (not shown).

With reference to FIG. 5, the apparatus 10 in accordance with the present invention is illustrated in operation for probing, testing, and penetrating a medium 80 which may include soil 82 with, as an example, rocks, 84, cavities 86 or buried objects 88. In this application, the apparatus 10 may further include one or more accelerometers 92, 94 which are positioned on the medium 80 remote from the bit 16 in order to since elastic waves 96 imported to the medium 80 by the hammering effect by the free mass 36 as will be hereinafter described in greater detail. The elastic waves 96 are represented in FIG. 5 by wave front propagating through the medium 80 in a divergent pattern represented by the arrows 98.

Figure 6:
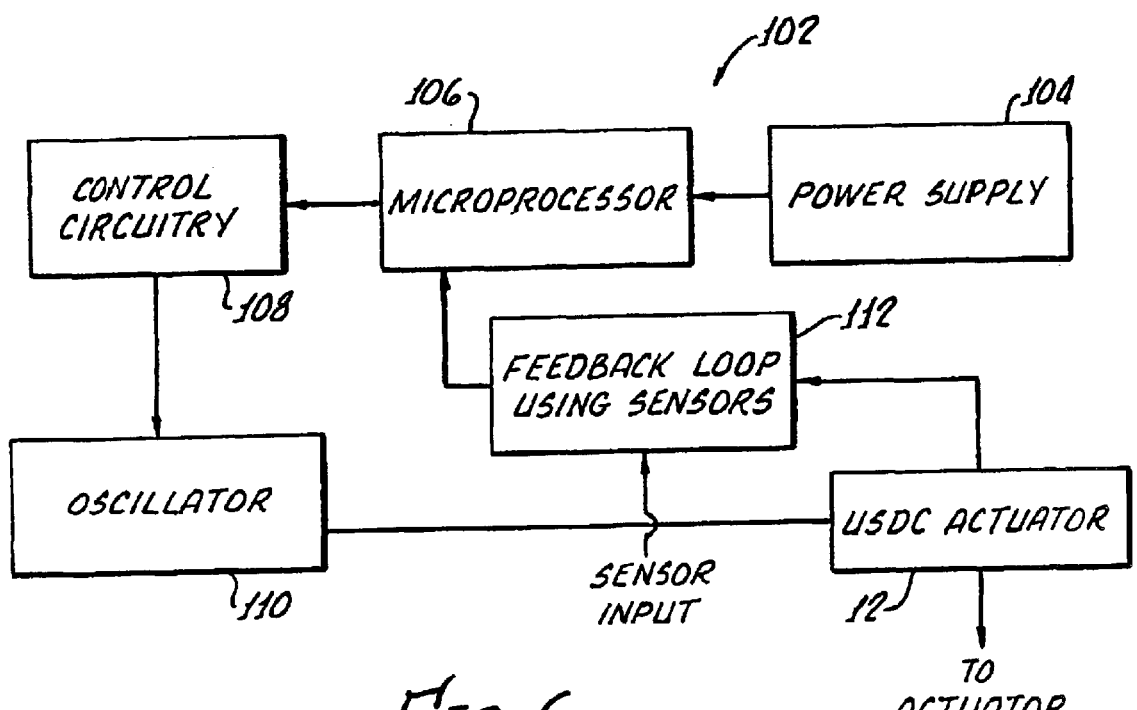
FIG. 6 is a block diagram of a controlled system suitable for driving an actuator and recording electrical and mechanical properties of the medium, during and after penetration of the bit into the medium.

With reference to FIG. 6, there is shown a block diagram of a control system 102 which is responsive to the accelerometers 92, 94, bit sensors 40, 42, 44, 46, 50, 52 and the sensor ceramics 66 for driving the actuator 12 and recording electrical and mechanical properties of the medium 80 before, during and after penetration of the bit 16 into the medium 80.

Generally, the system 102, includes a power supply 104 that can be a battery or AC source for running the actuator 12 through a micro-processor 106 control circuitry 108 and oscillator 110. A feedback loop 112 receiving input from sensors 40, 42, 44, 46, 50, 52 and sensor ceramics 66 as well as the accelerometers 92, 94, enables pulse frequency and duty cycle of the driver ceramics 64 that are be optimized to be low power of consumption. A temperature sensor 116, see FIG. 4 may be imputed to the microprocessor 106 to control any frequency shift that may result from induced heat in order to optimize the drill rate and duty cycle in real time. The feedback loop 112 insures that the interaction between drilling or coring through the bit 16 is maintained with an acceptable limit. During drilling, the piezoelectric driver ceramic 64 frequency is gauged via the feedback loop 112 and recalibrated to assure continuous optimized operation.

In summary, the present invention includes ultrasonic/sonic driller/corer (USDC) apparatus 10 that conducts drilling and coring using combined ultrasonic and sonic vibrations to collect sample material and various forms and provide feedback while probing and sensing a medium. The apparatus 10 performs in-situ probing, Smart-USCD, sample collection, delivery, sensing, gauging and analysis. The apparatus 10 is further useful for testing the fiscal and electrical properties in conducting chemical analysis to examine various objects, support a geological excavation and well as detect hidden or buried objects 88, chemical traces, resource, environmental hazards, landmines, etc. The data can be acquired as a function of depth providing positing dependant information.

Using the probing capability, the Smart-USCD apparatus 10 allows screening drilled materials by operating as a sounder of a ground sonar. The sounding is obtained by a hammering action of the free mass 36 and provides nonevasive probing of ground geology or such ventures, accelerometers 92, 94 can receive the imparted waves 96 for analysis. The information that can be extracted includes subsurfaced layered structure, mechanical properties, presents of geological cavities 86 etc.

Another probing capability is provided by measuring the change of electrical impedance of the actuator 12 which results from pressing the bit 16 against various solid object. Upon screening such touched objects, operation of the Smart-USDC can be focused onto mediums that have higher likelihood of meeting a chosen criteria.

Embedded sensors 50, 52 can provided a wide variety of detection techniques, including ground sonar, trace gas analysis, chromatography and so forth. Suitable commercially available sensors include thermocouples, Rf transducers, eddy current devices acoustical sensors, conductivity and dielectric property sensors, fiberoptic sensors, spectrometers and photoluminescence devices, for example.

Acquiring samples and various forms is important for many fields and the apparatus 10 in accordance with the present invention provides the capability to acquire a range of sample forms including cores 120 which may be extracted through the bit bore 24, horn bore 26 and bolt bore 28 as illustrated in FIG. 5. Tailings, dust, liquids, gases, volatiles and other byproducts of the drilling process may be extracted through the conduit 58 as indicated by the arrow 122 in FIG. 5.

In addition, because the bit 16 is non-rotating, the sample cores may have an arbitrary cross-section, e.g. circles, ellipsis, triangles, squares, stars, etc. The contamination of the extracted sample core 120 and the tailings is minimized since the apparatus 10 does not require lubricants and can be operated in a self-cleaning mode. As hereinabove noted, the self-cleaning mode is provided by the free mass which causes sonic vibrations which enable natural migration of debris from under the drilling/coreing bit and up and along the bit 16.

Thus, the apparatus 10 provides an inherent capability to extract drilling debris traveling on the bit 16 surface upward and away from the drilled well 124, see FIG. 4. This process a self cleaning mechanism estimated as exponential within the removed volume of debris resulting in extreme cleanliness of the sample inside the drilled well 124.

The self-cleaning mechanism provides sensors 40, 42, 44, 46, 50, 52 access to virgin samples for areas such as astro-biology, and search for life in the universe.

It should be appreciated that the sensors 40, 42, 50, 52 disposed at a tip 18 of the bit 16 are useful in measuring electrical properties of the medium 80 whereas the sensors 44, 46 may be useful in measuring, or determining, the electrical properties of medium debris and coring 120. Using the Smart-USCD apparatus 10 with onboard sensors 40, 42, 44, 46, 50, 52, allows in-situ sensing and analysis of the drilled or cored object 120 and can reach hidden areas otherwise requiring excavation and digging with significant amounts of work and possible destruction. Thus, beneficial use can be made of the apparatus 10 by Geologist, crime investigators, military personal and hobbyist.

MODES OF OPERATIONS

Figure 7:
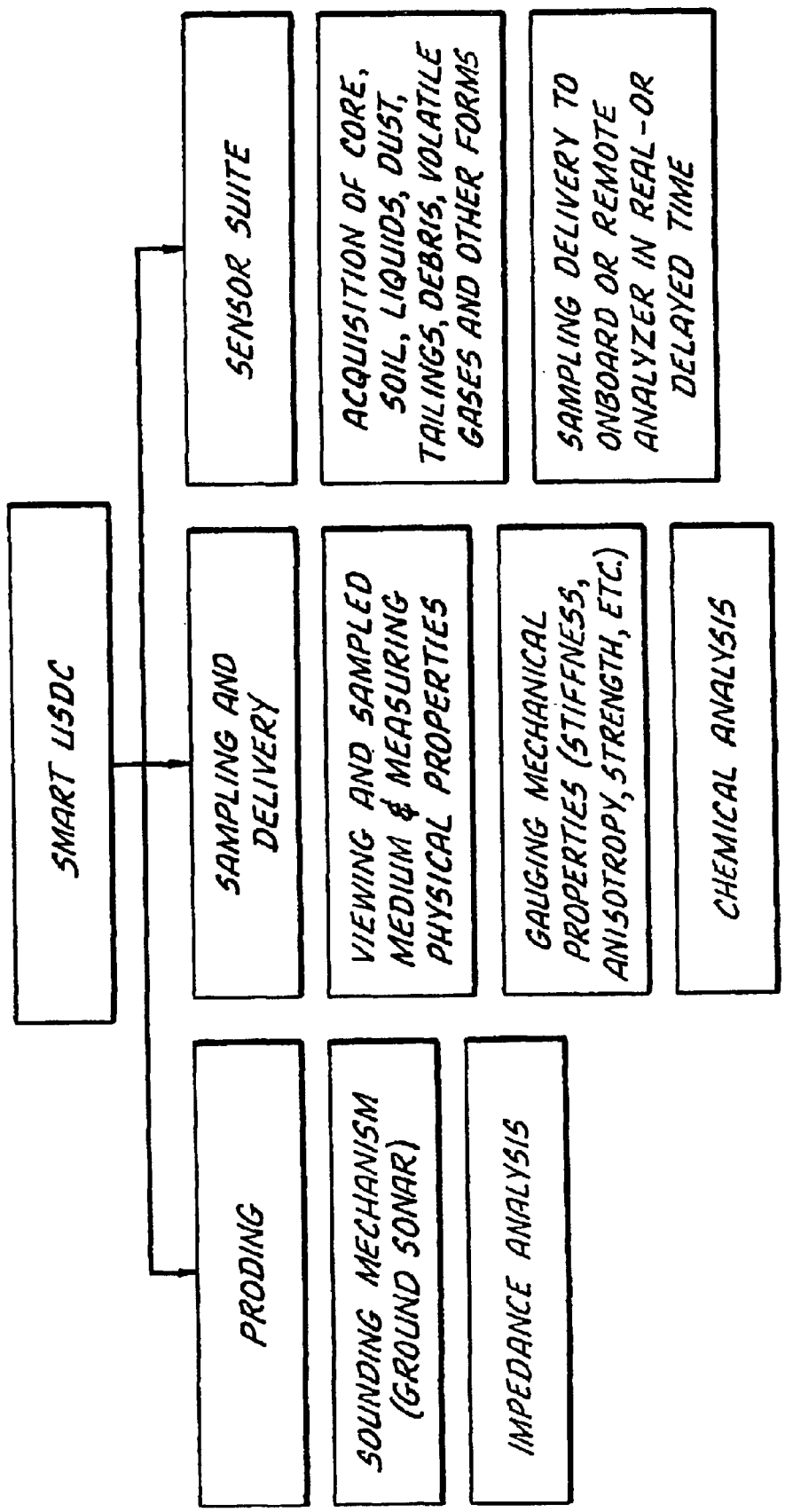
FIG. 7 is a block diagram illustrating various uses and functional modes of the apparatus in accordance with the present invention.

The apparatus 10 has a number of modes of operation has shown in block diagram in FIG. 7.

OPERATING AS A PROBING DEVICE

The hammering action (frequencies below ultrasonic transducer frequency) that is involved with the ultrasonic drilling process of USDC 10 offers a sounding mechanism for noninvasive probing of the drilled location and its surroundings. An additional probing capability is enabled via the fact that the electrical impedance of the ultrasonic driver or actuator 12 varies when the bit 16 is pressed onto the medium 80 and the data can be used to characterize the structure and mechanical properties of the medium 80. These two probing capabilities can be augmented with measurements from a temperature sensor 40 located at the tip 18 of the bit 16 to screen the drilled medium 80 including ground, concrete, rocks and soil 82.

A. Noninvasive Geophysical Probing

The induced hammering action provides a sounding mechanism for noninvasive probing of the ground geology to provide information about its subsurface structure 82, and mechanical properties. Accelerometers 92 or 94 may be used to sense the elastic waves 96 that are imparted into the ground 82 and to support analysis of the received wave characteristics. As a diagnostic tool, this probing method can provide information about the soil/rock mechanical properties, geological anisotropy, and layered characteristics as well as detect, locate and characterize geological cavities, and hidden or buried objects. Such a capability can be useful in such areas as construction and geological excavation, police investigation, as well as mine and resources detection. The principle behind such geophysical probing is that the induced elastic waves 96 travel through rocks and subsurface 80, encountering various interactions that can be analyzed. The presence of layers causes dispersive wave characteristics, small discontinuities cause scattering and attenuation, and large discontinuities (rocks 84, cavities 86, etc.) produce reflections. Methods are available to extract geophysical information from the imparted waves, offering effective probing, imaging and providing valuable information about the stiffness constants and other mechanical properties of soil and rocks. Generally, the elastic module of soils and rocks have distinctive ranges that vary over several orders of magnitudes. The use of noninvasive methods to determine the mechanical properties of the ground is an outgrowth of the field of seismology. These methods transmit elastic waves 96 through a medium 80 and analyze the received waves after interacting with the various geophysical features, layer characteristics, material/ground physical properties and flaws in the host media.

B. Impendence Analysis

As hereinabove discussed, the actuator 12 that drives the Smart-USCD apparatus 10 is a piezoelectric stack. Generally, when piezoelectric materials are pressed onto other objects their impendence is changed offering a gauging method of estimating the stiffness of the touched medium. By placing the bit 16 in contact with various samples or medium 80, information can be obtained that allows assessing the relevance of the probed medium 80 to the required task. By combining depth information with the impedance data stratigraphic variations information can be obtained about the drilled medium 80. Since the stiffness of soils and rocks has distinctive ranges that vary over several orders of magnitudes such data provides a quick method of characterizing the probed medium. Analytical studies indicate that driving a piezoelectric stack 12 at a frequency above the range of 30 KHz offers a method of distinguishing stiffness values with minimum effect of the medium structural geometry. Most ultrasonic actuators utilized as USDC drives permit similar operation.

PRODUCING VARIOUS FORMS OF SAMPLES

The making of various forms of samples for analysis and other objectives usually require a variety of instruments. The Smart-USDC apparatus 10 offers the capability to produce a large number of sample forms. Coring via the Smart-USCD apparatus 10 involves localized fracturing of the medium under impact load from the corer where the cored material 120 can be either extracted from the front of the bit 16 of the back of the actuator 12 thru the coaxial hole 28. Moreover, using the tubing 58 mounted on the side of the stepped horn 14, rock tailing, dust, gases, liquids, vapors and volatiles can be collected. The tubing 58 can be linked to a vacuum setup (not shown) and a trap (not shown) to collect the liquids, tailings, and dust whereas the gases, vapors and volatiles are collected into separate container areas. Tailing and drilling-debris that have traveled along the bit 16 can be collected via a trap (not shown) around the coring bit region. The trap can be designed as a telescopic fixture in order to accommodate length changes as the drill progresses into the rock or other sampled medium 80. Alternative drill bits can be shaped as closely spaced bits for perforation of objects for chopping selected sections. Also, the bit can be used as a sting to slice and carve objects by drilling and then pushing the sting sideways effectively operating as a "carving knife" or saw.

SENSOR SUITE

The fact that the drill bit 16 does not rotate allows the operation of bit-mounts sensors 40–46, 50–52 for in-situ analysis. Sensors 40, 42, 50, 52 can be placed near the bit tip 18 or imbedded into the tip of the drilling bit 16 for the examination of the freshly produced surfaces and tailings during the progression of the drilling or coring process. Further, sensors 44–46 can be mounted elsewhere on the bit 16. Sensors 126 may also be mounted on the actuation 12, see FIG. 3. The in-situ measurements can be performed by a variety of sensors including thermocouples, Rf transducers and receiver, eddy-current devices, acoustical sensors, conductivity and dielectric property sensors, chemical and biological indicators, and fiberoptics based devices (visible/IR spectrometers, photoluminescence devices, and Raman spectrometers to name a few). The data can be recorded as a function of depth either using optical encoding or position gauge) by the microprocessor 106. The Smart-USDC 10 has a self-cleaning capability that is due to continuous generation and constant removal of tailings 10 and debris. Under these conditions the ratio of surface and down-the-well contamination levels may be as high as exp (1.5.V/v), where V is the drilled out rock volume and v is the debris volume remaining under the drill bit. Contamination reductions in excess of a factor of 1000 may be achieved. In lubricants and filing from the gearboxes that are part of rotating-based mechanisms. These characteristics permit access to virgin materials 82 with virtually no contamination. It provides the sensors 40–46, that are mounted on the coring bit 16 with an access to virgin material 80.

A. Gauging Electric and Electromagnetic Properties

The apparatus 10 can be used to measure electrical phenomena, electric grounding properties, conductivity, electrostatic charges and electromagnetic properties of soil/rock. These measurements can be done with the aid of the sensors 40, 42 consisting of electrodes or inductive coils on the coring tip 18 and sensors 128 in the hollow core 28 of the drill actuator 12, see FIG. 1. A probing configuration can be made to measure frequency-dependent impedance. Using electrodes that are made of different materials, oxidization properties can be determined. By measuring the potential between the electrodes and conductivity as a function of time, data concerning soil reactivity can be extracted. Further, using a nitrogen-cooled Josephson junction superconductor coil, which can be placed along the hollow center 28 of the actuator 12, the electrostatic charge level of the sampled material can be determined.

B. Gauging Soil Strength, Impact Morphology and Mechanical Behavior

Soil strength and stability under mechanical loading are critical to erection of large structures. The force required to penetrate through a given ground depth carries information about the stability of the soil underneath 80. The Smart-USCD 10 can provide data without the need for high axial force by determining the penetration rate as a function of depth. Determining the mechanical characteristics of rock samples also takes advantage of the corer by suing it as a micro indenter. The piezoelectric elements 66 are used as a sensor to measure the force of impact and as feedback 112 to control the excitation of the horn 14. The morphology of the indented soil 80 and the applied force can provide quantitative information about the hardness, degree of plastic deformation, and impact energy dissipation.

Feedback

C. System Drive Performance Self-Optimization

A feedback mechanism to insure efficient operation of the drill. Piezoelectric sensors 66 are used in series with the driving stack actuators 64. The amplitude of the voltage on the sensors 66 is monitored and it provides data for the adjustment of the drive frequency. By adjusting the frequency maximum voltage amplitude on the sensor is maintained to ensure that for the given drive voltage that goes to the actuator maximum force is exerted on the horn and hence maximum displacement output is obtained at the horn tip 18.

Although there has been hereinabove described a specific apparatus for probing, testing and penetrating a medium in accordance with the present invention, for the purpose of illustrating the manner in which the invention may be used to advantage, it should be appreciated that the invention is not limited thereto. Accordingly, any and all modifications, variations or equivalent arrangements which may occur to these skilled in the art should be considered to be within the scope of the invention as defined by the appended claims.

What is claimed is:

1. Apparatus for probing testing and penetrating a medium, said apparatus comprising:
    an actuator for generating vibrations at ultrasonic frequencies;
    a horn coupled to said actuator for amplifying the actuator vibrations:
    a non-rotating coring and drilling bit for penetrating the medium, the bit having a drill stem attached to said horn; and
    a free mass, disposed between said horn and said drill stem for oscillating therebetween, in response to actuator vibration, for causing migration of medium debris around the bit for effecting self-cleaning of the bit.

2. The apparatus according to claim 1 wherein said horn includes a central bore therethrough, the bit includes a bore therethrough communicating with the horn base and actuator and free mass vibrations cause migration of medium debris through the bit and horn bores.

3. The apparatus according to claim 2 further comprising a conduit communicating with the horn bore for removing debris, including tailings, dust, gases, liquids, vapors and volatiles, from the apparatus through the actuator and bit bore.

4. The apparatus according to claim 2 further comprising sensors disposed at a bit tip for measuring electrical properties of the medium.

5. The apparatus according to claim 4 further comprising sensors disposed along the bit for measuring electrical properties of the medium debris.

6. The apparatus according to claim 2 wherein said actuator comprises a metal-piezoceramic-metal sandwich secured by a bolt in order to maintain compression on the piezoceramic and dissipate heat.

7. The apparatus according to claim 6 wherein the sandwich comprises at least one driver ceramic for generating the vibrations and at least one sensor ceramic measuring a force of impact of the bit against the medium in order to determine mechanical properties of the medium.

8. The apparatus according to claim 7 wherein said bolt includes a bore therethrough, the bolt bore communicating with the horn bore and the bit bore for enabling medium cores to be extended therethrough.

9. The apparatus according to claim 8 further comprising sensors disposed at a bit tip for measuring electrical, mechanical and biochemical properties of the medium.

10. The apparatus according to claim 9 further comprising sensors disposed along the bit for measuring electrical properties of the medium debris and cores.

11. The apparatus according to claim 10 further comprising at least one accelerometer for positing on the medium remote from the bit in order to sense electric waves imparted to the medium by the oscillating free mass.

12. The apparatus according to claim 11 further comprises a control system, responsive to the accelerometer, bit sensors and sensor ceramic for driving the actuator and recording the electrical and mechanical properties of the medium before, during and after penetration of the bit into the medium.

13. Apparatus for probing, testing and penetrating a medium, said apparatus comprising:
    an actuator for generating vibrations at ultrasonic frequencies;
    a horn coupled to said actuator for amplifying the actuator vibrations, said horn having a central bore therethrough;
    a non-rotating coring and drilling bit for penetrating the medium, the bit having a drill stem attached to said horn and a bore therethrough communicating with the horn bore;
    a free mass, disposed between said horn and said drill stem, for oscillating therebetween in response to actuator vibrations and causing a sonic hammering effect on the bit; and
    at least one accelerometer for positioning on the medium remote from the bit in order to sense elastic waves imparted to the medium by the hammering effect.

14. The apparatus according to claim 13 further comprising sensors disposed along the bit for measuring electrical mechanical and biochemical properties of the medium.

15. The apparatus according to claim 13 wherein said actuator comprises a metal-piezoceramic-metal sandwich secured by a bolt in order to maintain compression on the piezoceramic and to dissipate heat.

16. The apparatus according to claim 15 wherein the piezoceramic comprises at least one driver ceramic for generating the vibrations and at least one sensor ceramic for measuring a force of impact of the bit against the medium in order to determine mechanical properties of the medium.

17. The apparatus according to claim 13 further comprising a conduit communicating with the horn bore for enabling suction to be applied in order to remove medium debris, indicating tailings, dust, gases, liquids, vapors and valuables, from the apparatus.

18. The apparatus according to claim 17 further comprising sensor disposed at a bit tip for measuring electrical, mechanical and biochemical properties of the mediums.

19. The apparatus according to claim 18 further comprises sensors disposed along the bit for measuring electrical properties of the medium debris.

20. The apparatus according to claim 19 wherein said bolt includes a bore therethrough, the bolt bore communicating with the horn bore and the bit bore for enabling medium cores to be extracted therethrough.

21. The apparatus according to claim 20 further comprising sensor disposed along the bit for measuring electrical properties of the medium cores.

22. The apparatus according to claim 21 further comprising sensors disposed at an end of the bit for measuring electrical mechanical and biochemical properties of the medium.

23. The apparatus according to claim 22 further comprises sensors disposed along the bit for measuring electrical properties of the medium debris.

\* \* \* \* \*